(12) United States Patent
Parrella et al.

(10) Patent No.: US 11,940,072 B2
(45) Date of Patent: Mar. 26, 2024

(54) SURFACE ELEVATED ONSHORE AND OFFSHORE CABLE MOUNTING SYSTEM

(71) Applicant: Exotex, Inc., Houston, TX (US)

(72) Inventors: Michael J. Parrella, Katy, TX (US); Nevil R. Ede, Westport, CT (US)

(73) Assignee: EXOTEX, INC., Houston, TX (US)

( * ) Notice: Subject to any disclaimer, the term of this patent is extended or adjusted under 35 U.S.C. 154(b) by 97 days.

(21) Appl. No.: 17/488,710

(22) Filed: Sep. 29, 2021

(65) Prior Publication Data
US 2023/0109384 A1 Apr. 6, 2023

(51) Int. Cl.
*F16L 3/133* (2006.01)

(52) U.S. Cl.
CPC .................................. *F16L 3/133* (2013.01)

(58) Field of Classification Search
CPC . F16L 3/133; F16L 3/20; F16L 1/0243; F16L 1/0246; H02G 1/04; E01D 18/00
USPC .......................................... 248/58–59, 61–62
See application file for complete search history.

(56) References Cited

U.S. PATENT DOCUMENTS

| | | | | |
|---|---|---|---|---|
| 471,348 A * | 3/1892 | Collis | ........................ | F16L 3/18 248/62 |
| 1,007,432 A * | 10/1911 | Davis | ........................ | H02G 7/10 248/61 |
| 2,780,429 A * | 2/1957 | Vanier | ........................ | F16L 3/14 248/328 |
| 3,648,468 A * | 3/1972 | Bowers | .................... | F16L 1/026 405/157 |
| 3,677,189 A * | 7/1972 | Appelt | ................... | F16L 1/0243 14/19 |
| 4,054,210 A * | 10/1977 | Crocker | ................ | E21B 19/155 212/72 |
| 5,655,457 A * | 8/1997 | Sherman | .................. | E01B 25/16 14/18 |
| 6,655,641 B2 * | 12/2003 | Sherman | ................... | B61B 7/00 248/58 |
| 11,242,945 B2 * | 2/2022 | Libohova | .................. | H02G 3/32 |
| 2004/0035601 A1 * | 2/2004 | Dulhunty | .................. | H02G 7/14 174/40 CC |
| 2007/0176056 A1 * | 8/2007 | Sekine | ................... | F16L 1/0246 248/58 |
| 2014/0151616 A1 * | 6/2014 | Carroll | ...................... | H02G 1/04 254/134.3 R |

OTHER PUBLICATIONS

GRP pies with Flowtite continuous filament winding technology; Flowtite; Sep. 14, 2017; https://www.flowtite.com/technology/ (Year: 2017).*
Class A Galvanized Steel Strand; Conex Cable LLC; Mar. 24, 2018; https://conexcable.com/class-a-galvanized-steel-strand/ (Year: 2018).*

* cited by examiner

*Primary Examiner* — Ingrid M Weinhold
(74) *Attorney, Agent, or Firm* — Ware, Fressola, Maguire & Barber LLP

(57) ABSTRACT

A pipe mounting system comprising support cables is provided for use in mounting an above-ground elevated pipe or an underwater pipe. The pipe mounting system includes a suspended composite pipeline and a support cable. Multiple cable carriers are provided to carry the support cable along the length of the pipeline, and cradles or rings are provided that extend from the cable carriers and receive and support the pipeline.

14 Claims, 9 Drawing Sheets

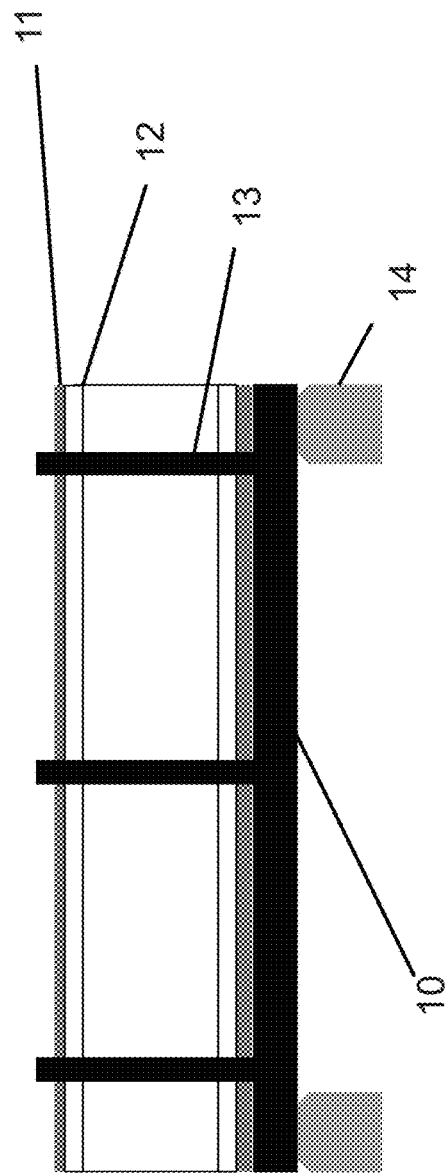
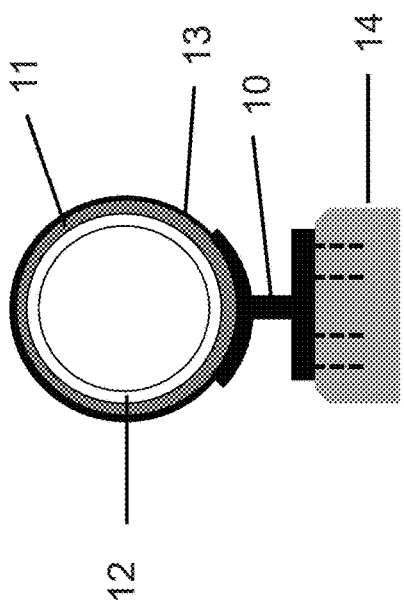
FIG. 1A
Prior Art
FIG. 1B
Prior Art

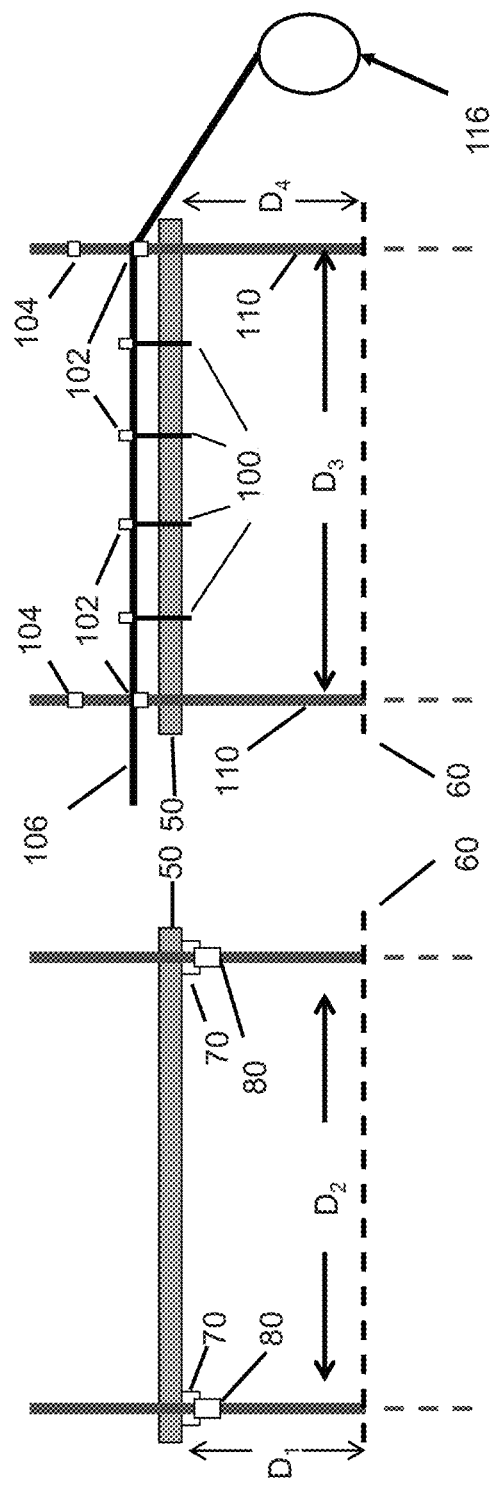

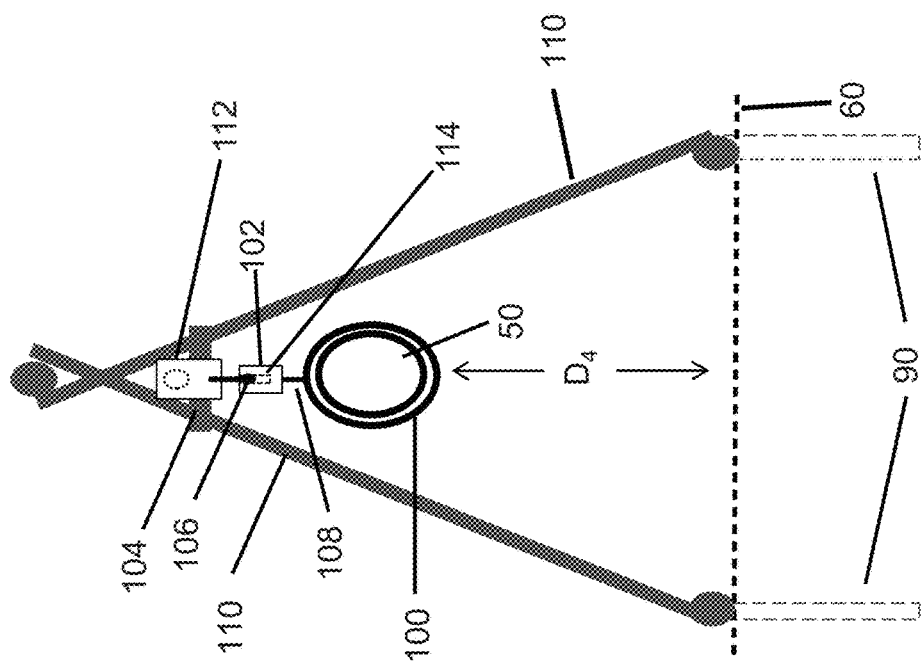
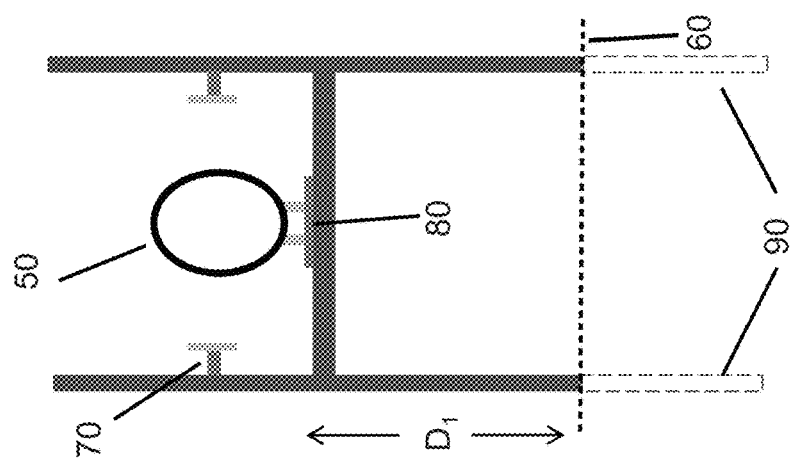
FIG. 3A
Prior Art
FIG. 3B

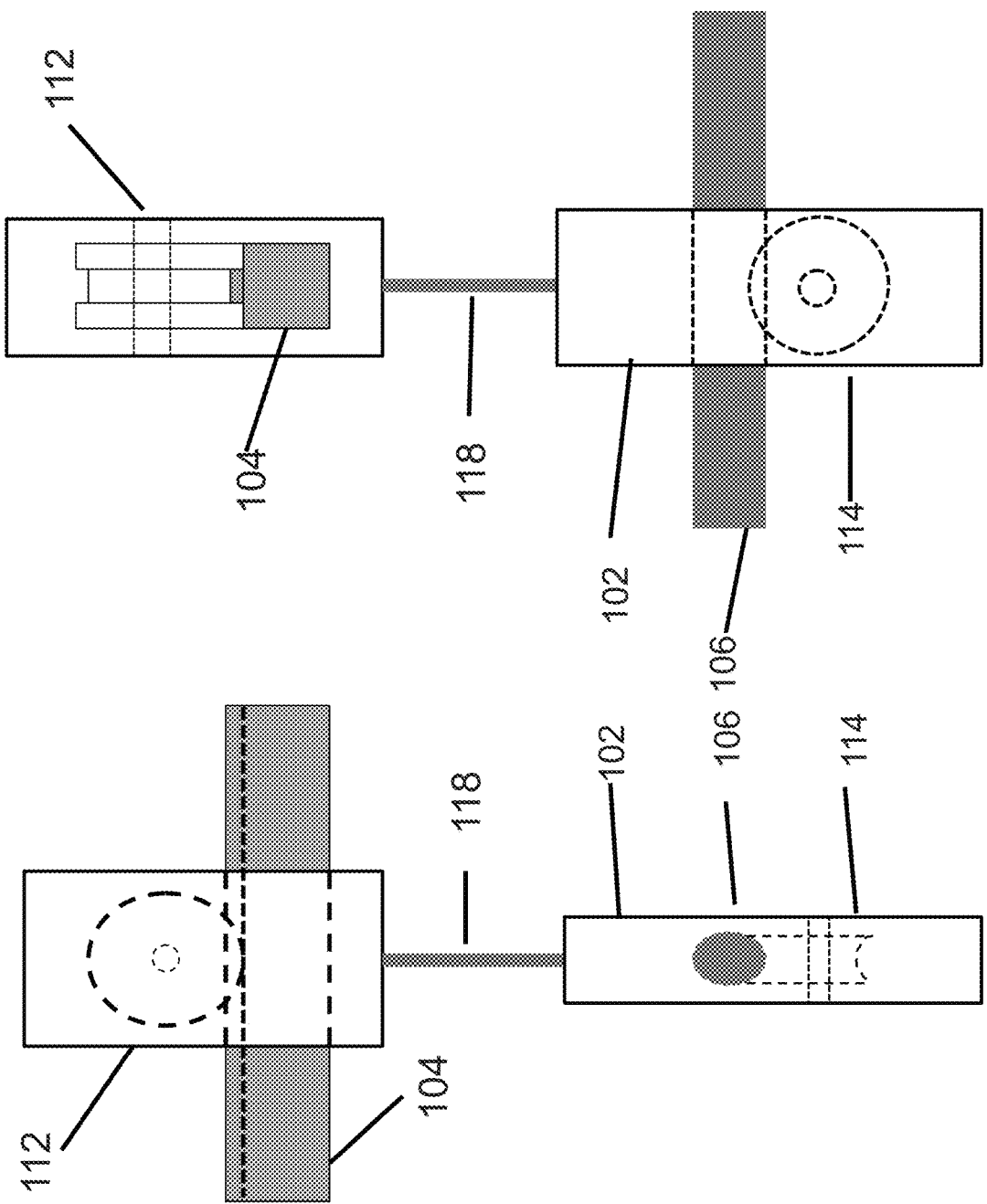

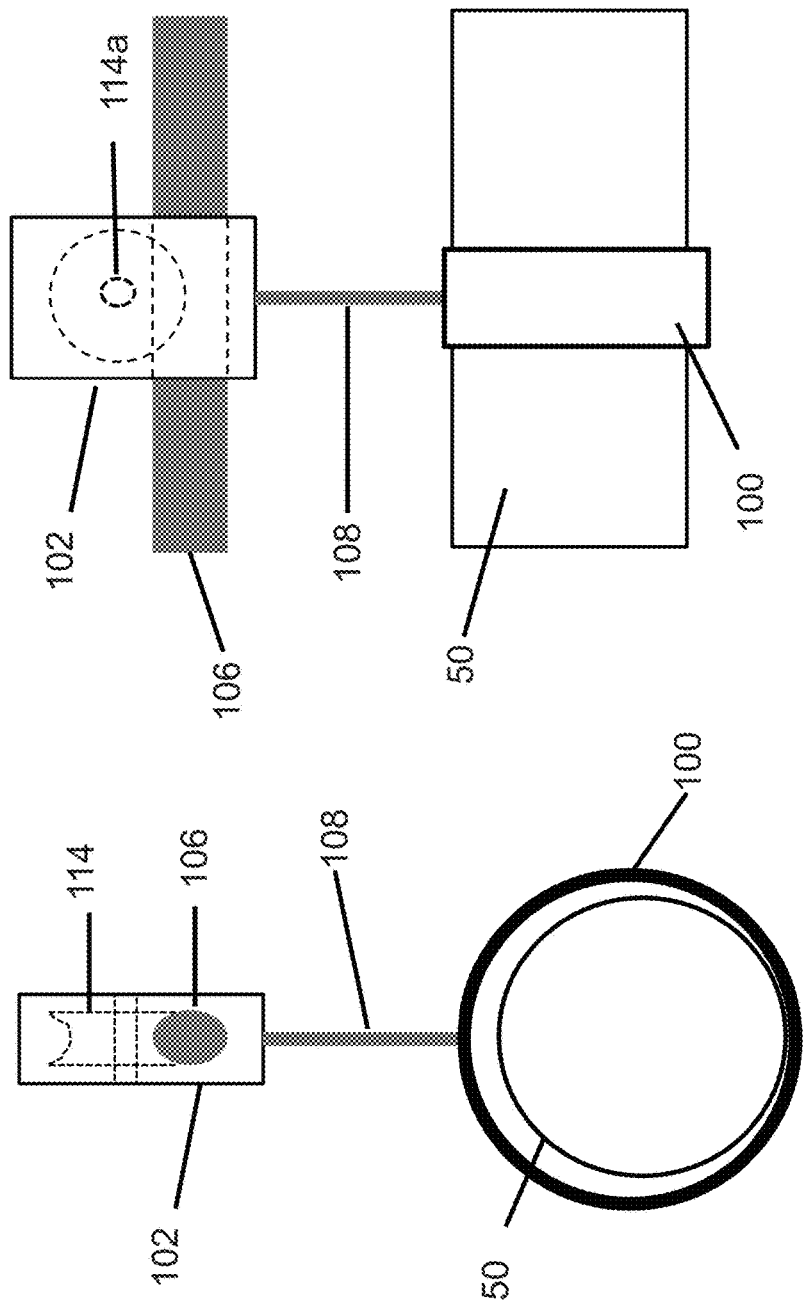

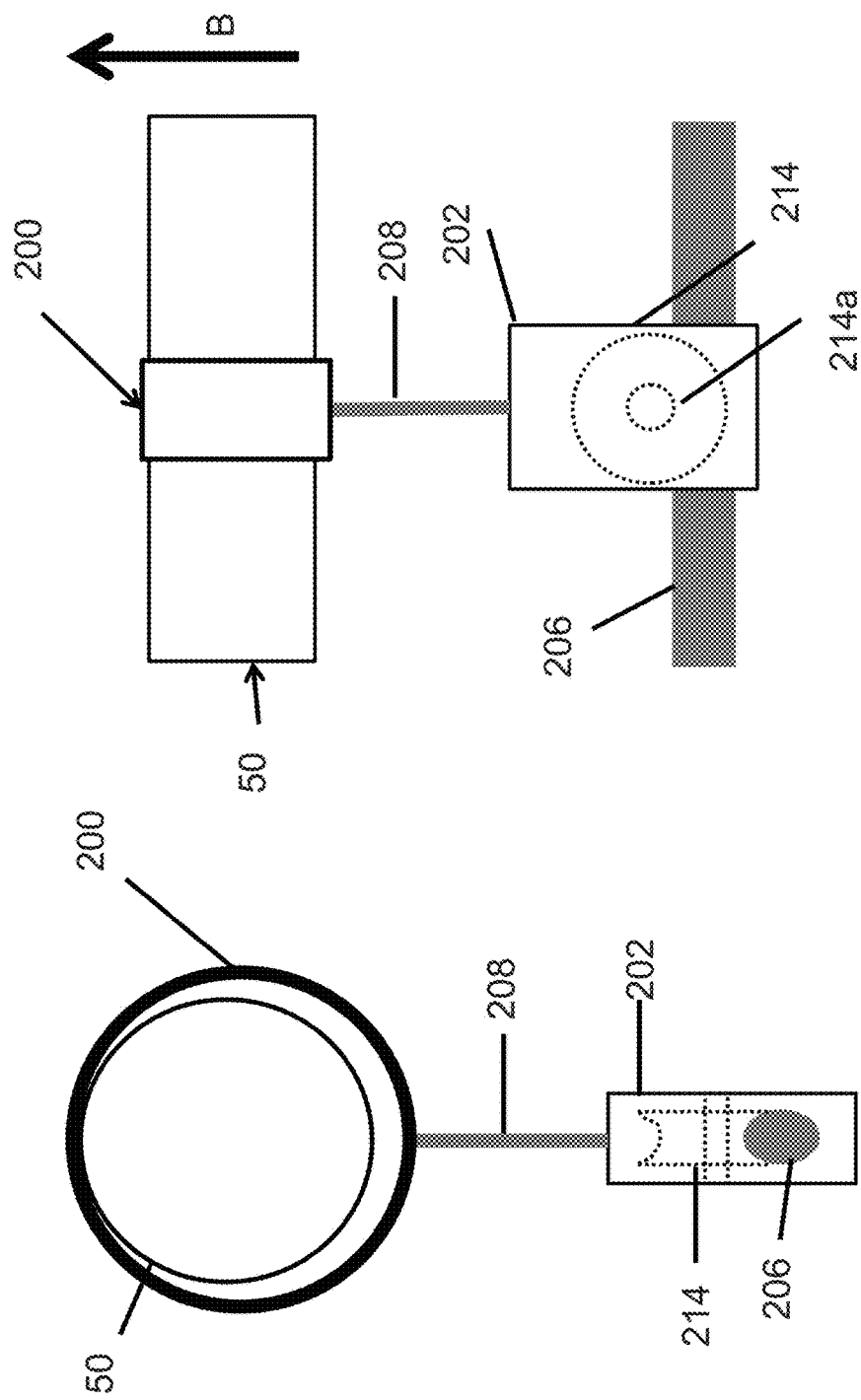

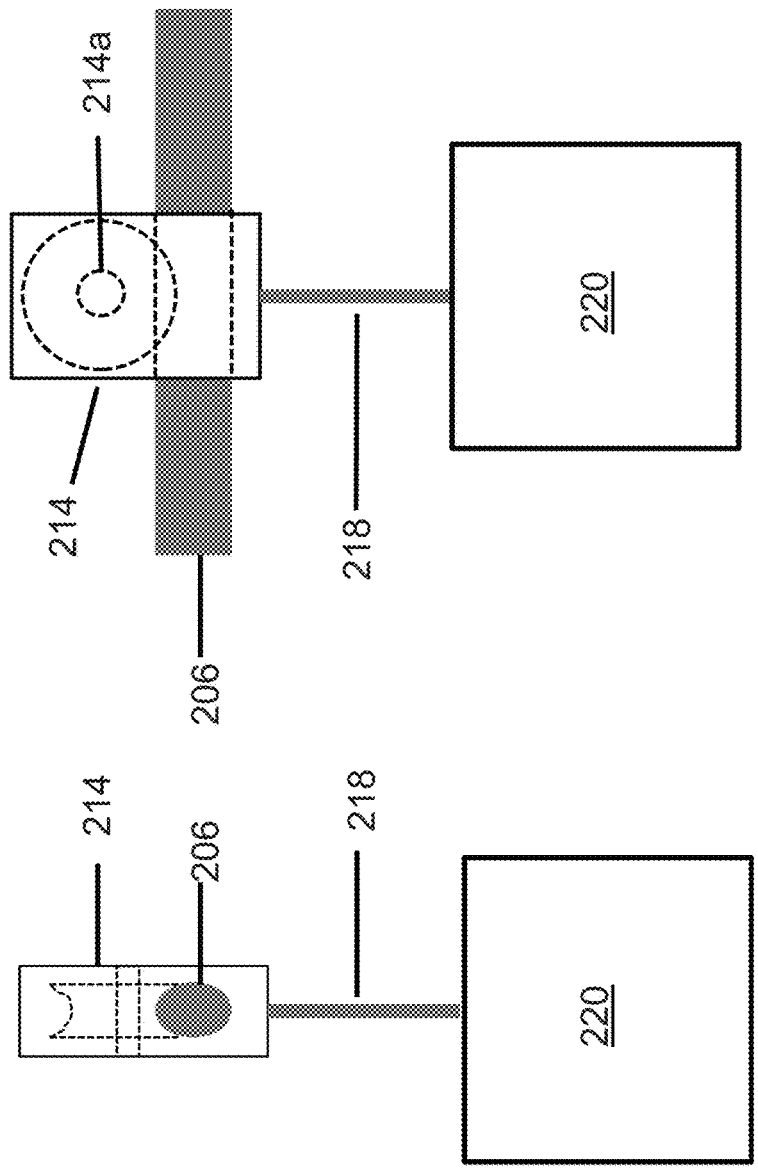
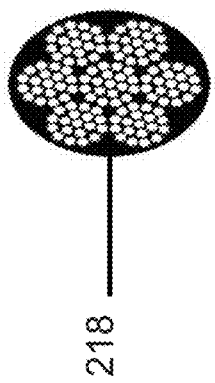
FIG. 7A
FIG. 7B
FIG. 7C

SURFACE ELEVATED ONSHORE AND OFFSHORE CABLE MOUNTING SYSTEM

BACKGROUND OF THE INVENTION

Current pipeline mounting systems require the pipe to have adequate horizontal tensile strength, thereby raising the price of the pipe. Using an I-beam or a cable supporting the pipeline, the horizontal tensile strength and the number of mounts can be greatly reduced, thereby reducing the pipeline costs. The stress of pipe movement due to thermal cycles and ground movement, as well as stress on welds can also lead to failure. The I-beam and cable mounting system should accommodate the thermal movement of the pipe. The lengths of spans are currently restricted between mounts because the structure of the pipe is responsible for bearing loads and permissible deflection tolerances are nominal. Increasing wall thickness to compensate for this makes the pipe significantly heavier. The required horizontal tensile strength of composite pipe can be dramatically reduced using an I-beam to support the pipe between mounts. The I-beam can support continuous pipes and pipes with connectors. Outer pipe sections will be connected using conventional technology (i.e., sleeves with adhesive or similar).

For above surface applications, a load bearing I-beam 10 as shown in FIG. 1 with widely spaced supports 14 reduces the number of mounting points. The I-beam 10 is placed atop several support trestles 14, which are spaced apart. The pipe, including outer pipe 11 and inner pipe 12, are placed atop the I-beam 10 and through a plurality of hoop retainers 13.

There are various problems with surface mounted pipes, including: surface mounted pipes restrict movement of native animal life and movement of machinery and vehicles; in cold environments, permafrost is being heated and destabilized by heat from the pipeline being transferred to ground (permafrost) primarily through conduction; conduction also occurs down to the ground through vertical support members (VSMs) even though they already have radiators built on top to dissipate heat, this heat travels from the pipeline to the pipe mounts and horizontal support member and then to the vertical support posts down to the ground; the ground beneath the pipe is also heated by a combination of conduction and convection through the air; and temperature changes create pipe movement stressing the pipe and mounting system.

SUMMARY OF THE DISCLOSURE

The present application addresses these shortcomings in the art and provides for an improved, elevated pipe mounting system and an underwater pipe mounting or support system. The pipe mounting system of the present application replaces rigid steel pipe and conventional mounting structures with a suspended composite pipeline and a cable design, and provides several benefits over conventional systems, including reducing costs, reducing weight, reducing heat loss in pipe and heat transfer from pipe to permafrost through the improved insulation and elimination of direct structures, reducing the number of mounting points, allowing the pipe to expand and contract independent of cable during temperature changes and lowering the horizontal pipe tensile strength requirements.

In accordance with the present application, a pipe mounting system is provided comprising: a support cable; a plurality of cable carriers configured to receive the support cable therethrough; and a plurality of cradles each secured to one of the plurality of cable carriers via a cradle cable and comprising an opening configured to receive a pipe therethrough; wherein the plurality of cradles are configured to support the pipe inserted therethrough over a surface.

The pipe mounting system may further comprise a first plurality of pulleys upon which the support cable is arranged configured to permit lateral movement of the support cable along the length of the pipe. Each of the plurality of cable carriers comprises one of the first plurality of pulleys.

The support cable may further comprise one or more spools of cable on one or both ends of the support cable, and the one or more spools of cable are mounted to a surface.

In one embodiment of the aforementioned pipe mounting system, the mounting system is a surface elevated cable mounting system, further comprising a plurality of mounting points, wherein each of the mounting points comprises one of the plurality of cable carriers mounted thereto. Each of the plurality of mounting points comprises: at least two opposing vertical support members; a cross-member disposed between and affixed to the opposing vertical support members; and a carrier cable extending from the cross-member and secured to the cable carrier. Each of the plurality of mounting points may also comprise a connecting member affixed to the cross-member and having the carrier cable secured thereto. The connecting member may further comprise a further pulley engaged with the cable carrier, configured to allow the cable carrier to be raised or lowered vertically. The plurality of cable carriers may also include cable carriers arranged along the support cable in between the mounting points. In embodiments of the surface elevate pipe mounting system, at least two adjacent mounting points of the plurality of mounting points are separated by at least 300 feet. The mounting system is configured to suspend the pipe in the plurality of cradles above ground, and may suspend the pipe at a height between nine and fifteen feet above ground.

In a further embodiment of the pipe mounting system, the mounting system is an underwater pipe mounting system, and the pipe is an underwater pipe and the plurality of cable carriers are suspended from the plurality of cradles by the cradle cables when underwater. In certain embodiments, the underwater pipe mounting system further comprises a plurality of weighted units suspended from at least a portion of the plurality of cable carriers by a further cable, wherein the weighted units are configured to counter the buoyancy of the pipe towards a water surface. The plurality of weighted units comprise a container comprising sand, gravel or another form of debris to provide weight to the container. In other certain embodiments, the support cable is mounted to a floor of a body of water in which the pipe is arranged.

In accordance with any of the aforementioned embodiments of the pipe mounting system, the support cable comprises a coated cable of galvanized steel having multiple strands each formed of multiple wires. Further in accordance with any of the aforementioned embodiments of the pipe mounting system, the pipe is made from a chopped filament fiber material.

BRIEF DESCRIPTION OF THE FIGURES

FIGS. 1A and 1B show profile and end views, respectively, of an example of a composite pipe mounted to an I-beam;

FIG. 2A shows a side view of a conventional surface mounted pipe system;

FIG. 2B shows a side view of an elevated pipe mounting system according to the present application;

FIG. 3A shows an end view of a conventional surface mounted pipe system;

FIG. 3B shows an end view of an elevated cable pipe mounting system according to the present application;

FIG. 4A shows a lengthwise view of a cross-beam arrangement in an elevated cable pipe mounting system according to the present application;

FIG. 4B shows a side view of a cross-beam arrangement in an elevated cable pipe mounting system according to the present application;

FIG. 5A shows an end view of a cradle arrangement in an elevated cable pipe mounting system according to the present application;

FIG. 5B a lengthwise view of a cradle arrangement in an elevated cable pipe mounting system according to the present application;

FIG. 5C shows a cross-sectional view of a support cable of an elevated cable pipe mounting system according to the present application;

FIG. 6A shows an end view of a cradle arrangement of an underwater pipe mounting system according to the present application;

FIG. 6B shows a lengthwise view of a cradle arrangement of an underwater pipe mounting system according to the present application;

FIG. 6C shows a cross-sectional view of a cable of a cradle system of an underwater pipe mounting system according to the present application;

FIG. 7A shows an end view of a buoyancy weighting system of an underwater pipe mounting system according to the present application;

FIG. 7B a lengthwise view of a buoyancy weighting system of an underwater pipe mounting system according to the present application;

FIG. 7C shows a cross-sectional view of a buoyancy weighting system of an underwater pipe mounting system according to the present application;

DETAILED DESCRIPTION OF THE FIGURES

Figure 8:
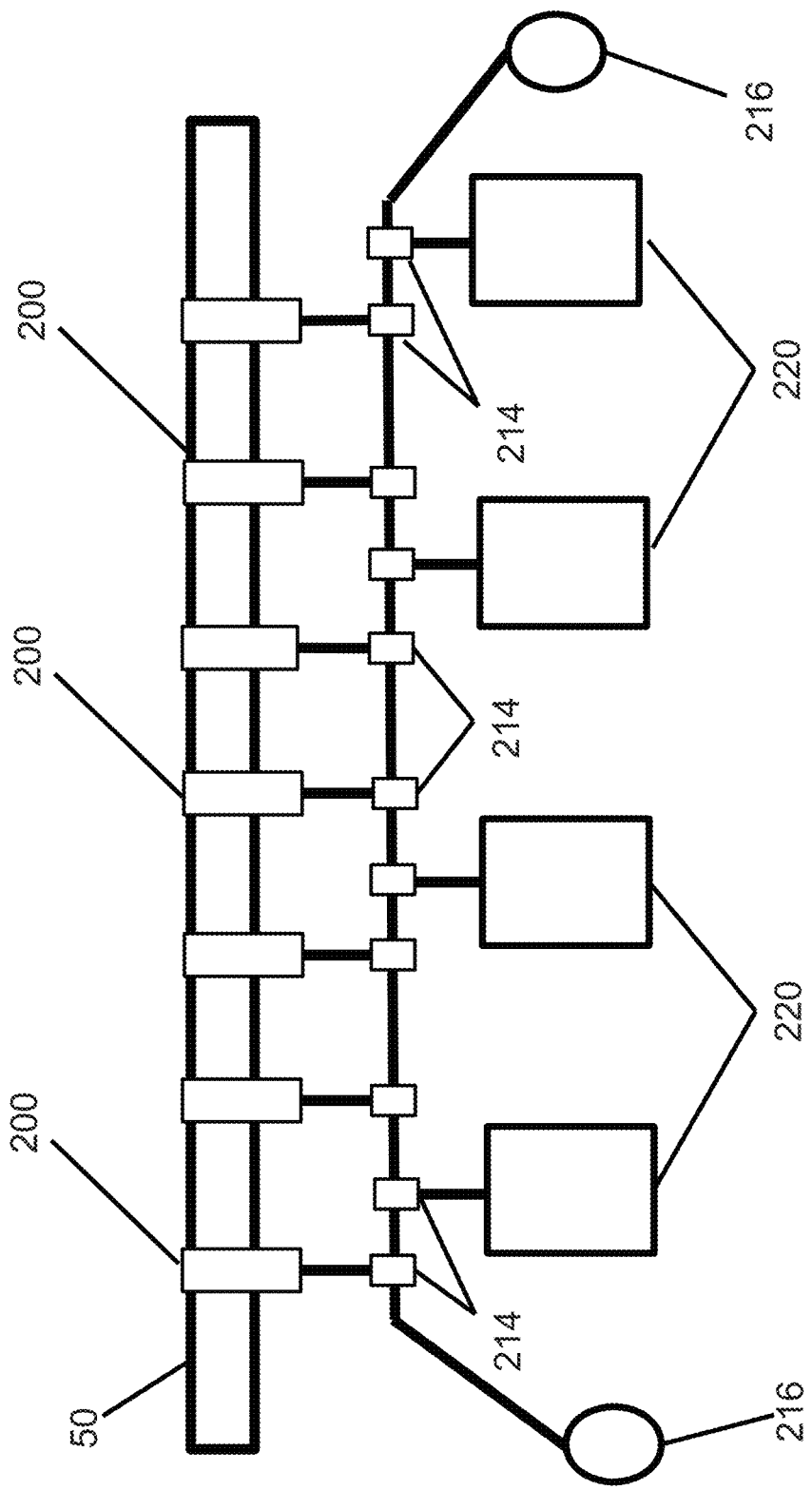
FIG. 8 shows an underwater pipe mounting system according to the present application.

The present application provides for an improved, elevated pipe mounting system and underwater pipe mounting system, which will be described with reference made to FIGS. 2-9.

FIGS. 2A and 3A show examples of a conventional pipe system and FIGS. 2B and 3B show examples of cable mounting and support system of an embodiment of the present application.

In the conventional system shown in FIGS. 2A and 3A, the pipe 50 is supported by support members 70 and cross-members 80. The pipe 50 is supported at a height ($D_1$) of approximately seven to nine feet above a ground or permafrost surface 60 and supported by in-ground supports 90, which may be forty feet in length. The mounting points for the pipe 50 can be separated by a distance ($D_2$) of approximately fifty-five feet.

The system of the present application includes a support cable 106 passing through a series of pipe carrier/cradles 100 arranged on the pipe 50, and includes vertical support members (VSMs) 110, cable carriers 102, and cross-members 104. Using this system, the distance ($D_3$) between vertical support members 110 is not limited by the structural strength of the pipe 50 and can be over three hundred feet, and the number of mounting points 110 is substantially reduced. A pulley system 112 allows vertical movement of the cradles 100 on the y-axis and a pulley system 114 allows lateral movement of a support cable 106 along the length of the pipe 50 on the x-axis.

The mounting system may include mounting structures comprising opposing vertical support members 110 having a cross-member 104 therebetween, which are connected to each of the opposing vertical support members 110. The opposing vertical support members 110 may be arranged parallel to each other or angled towards each other, as shown in the Figures. In-ground vertical supports 90 can be provided beneath the vertical support members 110 to secure the vertical support members 110 to the ground 60. A cable carrier 102 is connected to and extends from the cross-member 104, which carries a support cable 106. A plurality of further cable carriers 102 can be arranged along the support cable 106 in between the vertical support members 110. A plurality of pipe cradles or carriers 100 extend from the cable carriers 102, through which the pipe 50 is inserted. The cradles 100 hold and support the pipe 50, which may be arranged at a height ($D_4$) of nine to fifteen feet above the surface 60. One or more automated spools 116 of cable 106 can be provided to extend or retract the amount of support cable 106 needed to support the particular pipe 50.

A pipe-length view of the cross-member 104 and pulley system 112 at the vertical support members 110 is shown in FIG. 4A and a side view across the length of the pipe 50 is shown in FIG. 4B. A connecting member may be provided comprising the pulley 112, which is also secured to the cross-member 104, as shown in FIGS. 4A and 4B. A cable 118 is engaged to the pulley system 112, and is also secured to the cable carrier 102. With the pulley system 112, the cable 118 can be raised and lowered vertically, to adjust the height of the cable carrier 102 relative to the ground 60. The pulley system 112 may also provide for lateral movement along the cross-member 104. The cable carriers 102 arranged at the vertical mounting supports 110 include the support cable 106 passing therethrough, which are supported by a further pulley 114. The support cable 106 is able to move laterally along the length of the pipe 50 via the pulleys 114.

A pipe-length view of an example arrangement of a cradle 100 in between the vertical supporting members 110 is shown in FIG. 5A and a side view of the pipe cradle 100 across the length of the pipe 50 is shown in FIG. 5B. The support cable 106 passes through and is supported by the cable carrier 102. The cable carrier 102 includes a pulley 114 having a pulley axis 114a. The support cable 106 can be moved laterally along the pulley 114. The cable carrier 102 has a cradle cable 108 extending from the cable carrier 102, which is secured to the cradle 100. A pulley may also be provided that allows for the vertical movement of the cradle cable 108 to raise and lower the cradle. The pipe 50 passes through the cradle 100, which supports the pipe 50. The support cable 106 can be a ⅜" (three-eighths of one inch) diameter, 7×19 (having seven strands of nineteen wires) vinyl-coated galvanized steel cable or similar cable, and a cross-sectional view of the cable 106 is shown in FIG. 5C. The size or diameter of cable 106 can depend on the load driven by the commodity transported by the pipe and distance ($D_3$) between vertical support members 110. Using the system of the present application, the distance ($D_3$) between mounting points 110 is not limited by the structural strength of the pipe 50, therefore the number of mounting points 110 can be adjusted and a less expensive pipe 50 can be used.

In accordance with a further embodiment of the present application, an underwater pipe support system is provided, which is shown in FIGS. 6A-8.

An example of underwater pipe carrier cradle 200 is shown in FIG. 6A and FIG. 6B, which show a pipe-length view of the cradle arrangement in FIG. 6A and a side view of the pipe and cradle 200 across the length of the pipe 50 in FIG. 6B. A plurality of cradles 200 are provided, through which the pipe 50 is inserted. A cable 208 extends from the cradle 200, and is attached to a cradle carrier 202. The support cable 206 passes through and is supported by the cable carrier 202. The cable carrier 202 includes a pulley 214 having a pulley axis 214a. The support cable 206 can be moved laterally along the pulley 214. The support cable 206 can be a ⅜" diameter, 7×19 vinyl-coated galvanized steel cable or similar cable, and a cross-sectional view of the cable 206 is shown in FIG. 6C. The size of cable 206 will depend on the load driven by the commodity transported by the pipe and distance between cradles 200. Using the underwater system of the present application, the distance between cradles 200 is used to reduce the pipe's requirement for horizontal structural strength, therefore the number of cradles 200 can be used to reduce the cost of the pipe 50. As shown for example in FIG. 8, one or more automated spools 216 of cable 206 can be provided that can be mounted to the sea floor, to extend or retract the amount of support cable 206 needed to support the particular pipe 50.

An example of an underwater buoyancy weighting system is shown in FIGS. 7A and 7B, which show a pipe-length view in FIG. 7A and a side view in FIG. 7B. The cable carrier 202 has a further cable 218 extending therefrom, which is secured to a weighting unit 220. The weighting units 220 counter the buoyancy (B) of the pipe 50, as shown in FIG. 6B and prevent the pipe 50 from floating to the surface. The support cable 218 for the weighting units 220 can be a ⅜" diameter, 7×19 vinyl-coated galvanized steel cable or similar cable, and a cross-sectional view of the cable 218 is shown in FIG. 7C. The buoyancy weighting unit 220 can be filled with any substance that is heavier than the pipe 50, including but not limited to sand, gravel, or any other type of debris. The size of cable 218 may depend on the load driven by the commodity transported by the pipe 50 and distance between cradles 200. Using this underwater system, the distance between cradles 200 is used to reduce the pipe's requirement for horizontal structural strength, therefore the number of mounting points can be adjusted and a less expensive pipe can be used.

A further example of the underwater pipe system with buoyancy weighting system is shown in FIG. 8. Depending on the application, one or both of a cable 206 alone or cables 206 mounted to the sea floor and/or buoyancy weights 220 can be provided to support the underwater pipe 50. For example, for pipes 50 in shallow water, cables 206 alone may be sufficient without weights 220, as the cables 206 can be provided with floor mounts that reach the sea floor, and a number of cables 206 can be provided depending on the length of the pipe 50. In deeper water, buoyancy weights 220 may be used, as the water may be too deep to mount cables 206 to the sea floor along the pipe 50. The pipe 50 used in any of the above-described embodiments can be optionally insulated to lower changes in viscosity.

Figure 9:
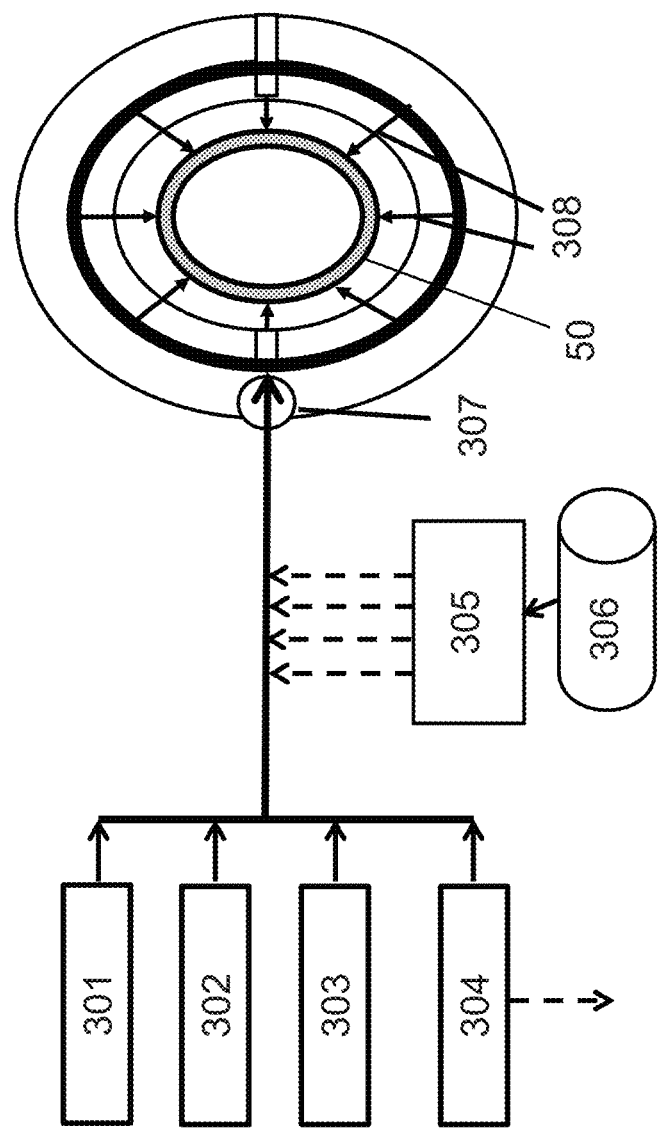
FIG. 9 shows a pipe insulation system according to the present application.

An example of a pump insulation system is shown in FIG. 9. The pipe insulation system of the present application provides superior performance and more economic insulation systems compared to conventional pipe wraps. The insulation system coats pipe 50 rapidly with a highly insulative layer. Additional properties can also be simultaneously conferred as required. The PP/PVDF high-impact resin 301 may be combined with hardeners 302 and multiple additives 303, 304 that can deliver high insulation properties, impact/abrasion resistance, and pigments. Fiber 306 chopped by a chopper 305 can be varieties of glass or basalt depending on requirements. The insulation application process is through a hinged clamp ring 307 and nozzles 308. Coating thickness can be varied as required and cure time is relatively short. Keying and coating can be performed on-site at installation, providing low material and transportation costs, and no waste or environmental impact. The pipe insulation eliminates need for insulation on the ground beneath the pipe 50.

The pipe mounting system of the application provides several costs other benefits, as the number of vertical support members can be reduced, the components can be made from corrosion resistant materials, such as composite pipe, galvanized and vinyl coated steel cable, and the pipe provides intrinsically higher thermal resistance, thereby reducing insulation requirements and avoiding a need to enhance vertical support members over their standard design to reduce permafrost damage. The support systems of the present application may be used with various pipes, including the pipes described in International Patent Application Nos. PCT/US2016/052822 (filed Sep. 21, 2016), PCT/US2016/019068 (filed Feb. 23, 2016) and PCT/US2016/019077 (filed Feb. 23, 2016), which are each incorporated by reference in their entireties.

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale. Although the invention has been described and illustrated with respect to exemplary embodiments thereof, the foregoing and various other additions and omissions may be made therein and thereto without departing from the spirit and scope of the present invention.

What is claimed:

1. A pipe mounting system comprising:
 a support cable;
 a plurality of cable carriers configured to receive the support cable therethrough;
 a plurality of cradles each secured to one of the plurality of cable carriers via a cradle cable and comprising an opening configured to receive a pipe therethrough; and
 a plurality of mounting points;
 wherein the plurality of cradles are configured to support the pipe inserted therethrough over a surface; and
 wherein each of the plurality of mounting points comprises one of the plurality of cable carriers mounted thereto, and:
 two opposing vertical support members;
 a cross-member disposed between and affixed to the two opposing vertical support members; and
 a carrier cable extending from the cross-member and secured to the cable carrier.

2. The pipe mounting system according to claim 1, wherein each of the plurality of mounting points comprises a connecting member affixed to the cross-member and having the carrier cable secured thereto.

3. The pipe mounting system according to claim 2, wherein the connecting member further comprises a further pulley engaged with the cable carrier, configured to allow the cable carrier to be raised or lowered vertically.

4. The pipe mounting system according to claim 2, wherein the plurality of cable carriers comprise cable carriers arranged along the support cable in between the mounting points.

5. The pipe mounting system according to claim 1, wherein at least two adjacent mounting points of the plurality of mounting points are separated by at least 300 feet.

6. The pipe mounting system according to claim 1, wherein the pipe mounting system is configured to suspend the pipe in the plurality of cradles above ground.

7. The pipe mounting system according to claim 6, wherein the plurality of cradles suspend the pipe at a height between nine and fifteen feet above ground.

8. The pipe mounting system according to claim 1, wherein the support cable comprises a coated cable of galvanized steel having multiple strands each formed of multiple wires.

9. The pipe mounting system according to claim 1, further comprising:

a first plurality of pulleys upon which the support cable is arranged configured to permit lateral movement of the support cable along the length of the pipe.

10. The pipe mounting system according to claim 9, wherein each of the plurality of cable carriers comprises one of the first plurality of pulleys.

11. The pipe mounting system according to claim 10, wherein each of the plurality of mounting points comprises a connecting member affixed to the cross-member and having the carrier cable secured thereto.

12. The pipe mounting system according to claim 11, wherein the connecting member further comprises a further pulley engaged with the cable carrier, configured to allow the cable carrier to be raised or lowered vertically.

13. The pipe mounting system according to claim 1, wherein the support cable further comprises one or more spools of cable on one or both ends of the support cable.

14. The pipe mounting system according to claim 13, wherein each of the one or more spools of cable are mounted to a surface.

\* \* \* \* \*